Jan. 6, 1959    H. H. CAMPBELL    2,867,456
SEAL
Filed July 30, 1956
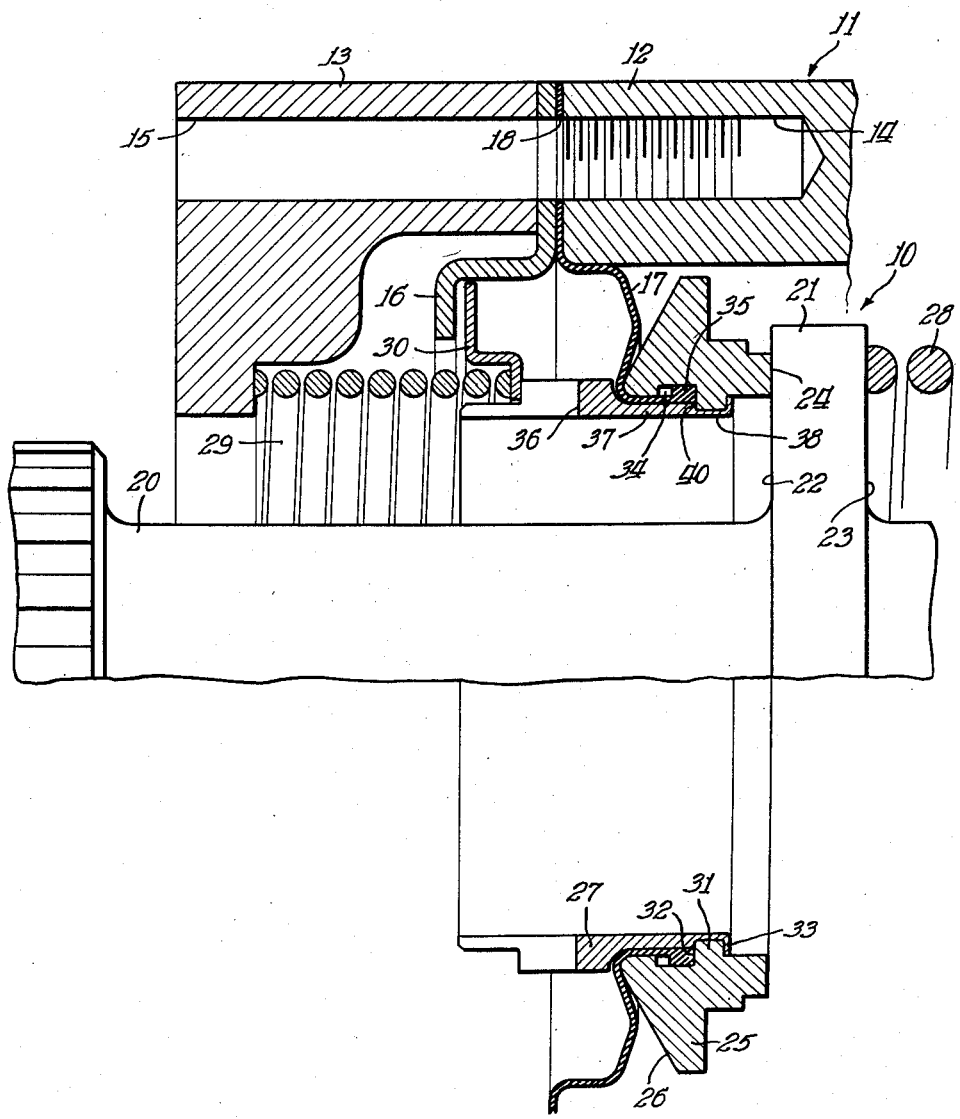
Inventor:
Henry H. Campbell
By: Joseph R. Duryea  Atty.

United States Patent Office

2,867,456
Patented Jan. 6, 1959

2,867,456

SEAL

Henry H. Campbell, East Cleveland, Ohio, assignor to Borg-Warner Corporation, Chicago, Ill., a corporation of Illinois Application July 30, 1956, Serial No. 600,932

5 Claims. (Cl. 286—11)

This invention relates to rotary shaft seals and particularly relates to a new and improved rotary shaft seal and the method of assembly thereof especially adapted for a fluid pump drive shaft coupling.

It is an object of this invention to provide a rotary shaft seal which is both economical and efficient to manufacture as well as efficient in operation and maintenance.

Still another object of this invention is to provide a new and improved method of assembling rotary shaft seals of this character whereby such seals are assembled efficiently as well as economically.

In the U. S. patent to Roth No. 2,434,589 dated January 13, 1948 there is described and claimed a rotary shaft seal whereby the stationary housing is sealably coupled to a rotating shaft and thus high pressure fluids developed by a pump are effectively prevented from leaking out the pump through the drive coupling arrangement. In that sealing arrangement a flexible or resilient diaphragm member is disposed between a non-rotating bearing and sealing ring means and a confining shell means and sandwiched between two members of the pump housing itself. This flexible diaphragm has a centrally located aperture and the inner periphery thereof is disposed between the bearing and sealing ring means and the confining shell means and the latter is spun into attaching relationship with the bearing and sealing ring means so as to permanently affix all three together. It has been found in practice, however, that during assembly of these three members, the diaphragm, bearing and sealing ring means and confining shell means that damage often occurs to the flexible diaphragm and thus easily rupturable making it unfit for use. This results in a large number of rejects obviously increasing the cost of manufacture of these sealing arrangements as well as slowing down the production thereof.

My invention reduces the danger of rupture of the diaphragm during assembly of rotary shaft seals of this type with a consequent decrease in the number of rejects of such assemblies and provides a more economical method for their manufacture. I propose to accomplish this by providing a bearing and sealing ring means with a radially inwardly extending lip or flange and a radially outwardly extending groove which cooperates with a radially extending surface on the confining shell means to selectively locate these two members in a predetermined relationship with the diaphragm so that when the confining shell is spun into attaching relationship with the bearing and sealing ring means all three are permanently assembled in fluid tight relationship. This method of assembling and prelocating the precise position between the three members may be done economically according to present methods of mass production in the hands of less experienced machine operators with an extremely limited number of rejects.

Accordingly, it is a more particular object of my present invention to provide a rotary shaft sealing arrangement whereby two members thereof precisely locate a resilient diaphragm therebetween, all of which can be assembled into fixed relationship with one another according to present-day methods of mass production.

Accordingly, it is still another object of my present invention to provide a new and improved method of assembling rotary shaft seals of the present type economically and efficiently yet provide a seal which is efficient in operation and maintenance.

Other and more particular objects, advantages and uses of my invention will become apparent from a reading of the following specification taken in connection with the accompanying drawing which forms a part thereof and wherein the single figure is a segmental and broken-away, axial, sectional view of a portion of a rotary fluid pump incorporating the preferred embodiment of my invention.

The accompanying figure is a longitudinal sectional view through the seal.

Referring now in greater detail to the drawing, there is shown a portion of a rotary seal arrangement, indicated in its entirety by numeral 10 incorporated in a pump, a portion of which is indicated in its entirety by numeral 11. Pump 11 comprises generally a housing member 12 and a cover member 13 conveniently affixed to one another by bolt means (not shown) which is suitably threaded into bores 14 and 15 formed respectively in the housing 12 and cover member 13. Sandwiched between the housing 12 and the cover member 13 is a portion of rocker supporting ring means 16 and the radially outer portion of the resilient flexible diaphragm 17, usually of synthetic or natural rubber, suitably apertured as at 18 to embrace the bolt means threadably inserted into bores 14 and 15. The central or radially inner portion of the diaphragm 17 is apertured so as to embrace drive shaft means 20 of the pump coupling. Shaft 20 has intermediate its ends a radially extending, relatively thin, flange 21 which forms an outwardly or leftwardly facing (as shown in the drawing) radially extending bearing and seal surface 22 and an inwardly facing radially extending surface 23. Operatively engaging the bearing and seal surface 22 in sealing relationship is a radially extending bearing and seal surface 24 of a non-rotating bearing and sealing ring means 25. Bearing and sealing ring means 25 is also provided with an outwardly facing yet generally radially extending inclined surface 26. Flexible sealing diaphragm 17, being provided with the centrally located opening or aperture, embraces shaft 20 in radially spaced relationship and has its radially inner portion sealably attached to bearing and sealing ring means 25 through the medium of a confining shell means 27 which may be spun into attaching relationship therewith as will be pointed out in more detail hereinafter. A relatively heavy compression spring 28 operatively engages at one end against surface 23 of shaft flange 21 and a relatively light compression spring 29 operatively engages the radially inner portion of universal joint-like rocker assembly means 30 which in turn cooperates with the radially inner portion of supporting ring means 16.

The mechanical cooperation between springs 28 and 29; the universal joint-like assembly 30 and the supporting ring means 16, as well as the hydraulic cooperation between the inclined surface 26 of bearing and sealing ring means 25 and surface 23 of shaft flange 21 provide an efficient rotary seal between the pump 11 and the rotary shaft 20 in a manner taught by the above mentioned U. S. patent to Roth No. 2,434,589. Since it is the particular arrangement of the bearing and sealing ring means 25, the confining shell means 27 and the flexible diaphragm 17 and their method of assembly to which my present invention is directed and since the overall operation of the complete rotary seal assembly 10 is explained in detail in said patent, no further detailed explanation of assembly 10 is deemed necessary herein.

Particular attention is now directed to the bearing and sealing rings means 25 and the confining shell means 27 which are suitably attached to each other and which confine the radially inner portion of the flexible diaphragm 17 as aforesaid. It is to be noted that intermediate the ends of the bearing and sealing ring means 25 and extending radially inwardly there is provided a lip or flange 31 having on one side thereof an outwardly facing surface 32 extending substantially normal to the axis of rotation of the shaft 20 and on the other side an inwardly facing surface 33 substantially parallel to surface 32. Surface 32 forms one side of a radially outwardly extending groove 34 formed in the bearing and sealing ring means 25 and into which is disposed an enlarged lip or flange 35 formed about the centrally located aperture of the diaphragm 17. The deformable shell confining means 27 is formed with three portions or steps, a relatively thick portion, shown to the left of the drawing and indicated in its entirety as 36, an intermediate portion indicated in its entirety as 37 and a relatively thin end portion indicated in its entirety as 38 and shown to the right in the drawing. The steps 36, 37 and 38 form faces or planes facing radially outwardly which are the outer diameters of the ring-like shell confining means and which cooperate with the radially inwardly facing surface of the inner portion of the bearing and sealing ring means 25. A radially outwardly extending surface 40 formed between the intermediate portion 37 and the relatively thin portion 38 effectively cooperates with surface 32 of bearing and sealing ring means 25 to properly locate the pre-determined final relationship between the bearing and sealing ring means 25 and the confining shell 27.

Obviously, the three faces facing radially outwardly on the deformable confining shell means and their complementary radially inwardly facing surface on the bearing and sealing ring means are spaced sufficient to compensate for the thickness of the flexible diaphragm disposed therebetween in tight liquid seal relationship.

In assembling the diaphragm 17 between the bearing and sealing ring means 25 and the confining shell means 27, the radially inner portion of the diaphragm 17 with its lip 35 is disposed or inserted in the groove 34 and the shell confining means 27 is axially inserted or telescoped into the bearing and sealing ring means 25 so that the outer diameter of a portion of the shell confining means 27 is in contact with a portion of the diaphragm and similarly the radially inwardly facing surface of the bearing and sealing ring means 25 is in contact with the opposite side of the diaphragm and the diaphragm is held permanently and tightly therebetween. The radially extending surface 40 contacts the radially extending surface 32 of the bearing and sealing ring means 25 when the shell confining means is properly telescoped within the bearing and sealing ring means and in that manner the final disposition of the two with respect to each other is pre-determined. In the final operation, the right end portion of the relatively thin portion 38 is spun around and formed to contact with the surface 33 to provide an attached relationship therebetween.

The radially inwardly extending flange 31 and the surface 40 precisely pre-locate the relative placement of the two members 23 and 26 so that a proper space is provided, during this assembling operation, between the point where the relatively thick portion 36 might contact the inclined plane or surface 26 of the bearing and sealing ring means 25, a point where prior art seals often ruptured or tore the diaphragm during assembly. In other words, surface 40 is located on the shell confining means 27 with respect to the axial thickness of the bearing and sealing ring means 25 so that there is little danger of damage to the flexible diaphragm 17 during assembly.

It is to be expressly understood that this invention, in its broadest aspects, consists of a sealing means and method of assembly thereof between a stationary element and a rotary element. It is not to be limited to the specific type of pump housing or pump; these being employed to facilitate description only.

Wherein the various parts of this invention have been referred to as located in a right or left or an upper or lower or inward or outward position, it will be understood that this is done solely for the purpose of facilitating description and that such references relate only to the relative positions of the parts as shown in the accompanying drawing.

Also, it is to be understood that many changes and modifications may be made without departing from the spirit and scope of the invention and the invention is designed and comprehended within the scope of the appended claims which should be given a scope consistent with the prior art.

I claim:

1. In a fluid seal assembly for a rotary shaft having a radially extending flange, a diaphragm, a sealing ring, resilient means biasing said flange against said sealing ring and resilient means biasing said sealing ring toward said flange from an opposite direction; the improved means of attaching said seal ring to said diaphragm comprising a radially inwardly extending flange on said sealing ring intermediate the ends thereof, a portion of said diaphragm inserted in said sealing ring, a cylindrical confining shell having an outwardly extending flange intermediate the ends thereof, said confining shell inserted in said portion of said diaphragm and holding said diaphragm against said sealing ring, a radially extending surface on said shell in contact with said radially inwardly extending flange whereby the sealing ring and shell are assembled in a pre-determined relationship so that said outwardly extending flange of said confining shell does not engage said diaphragm.

2. In a fluid seal assembly for a rotary shaft having a radially extending flange, a diaphragm, a sealing ring, resilient means biasing said flange against said sealing ring and resilient means biasing said sealing ring toward said flange from an opposite direction; the improved means of attaching said sealing ring to said diaphragm comprising a radially inwardly extending flange on said sealing ring intermediate the ends thereof, a confining shell telescoped within said sealing ring, a radially extending surface on said shell in contact with said radially inwardly extending flange whereby the sealing ring and shell are assembled in a pre-determined relationship and another radially extending surface on said shell formed in contact with said radially inwardly extending flange whereby said confining shell is fixed within said sealing ring.

3. In a fluid seal assembly for a rotary shaft having a radially extending flange, a diaphragm, a sealing ring, resilient means biasing said flange against said sealing ring and resilient means biasing said sealing ring toward said flange from an opposite direction; the improved means of attaching said sealing ring to said diaphragm comprising a radially inwardly extending flange on said sealing ring intermediate the ends thereof, a confining shell telescoped within said sealing ring and holding a portion of said diaphragm radially outwardly against an inner portion of said sealing ring, a radially extending surface on said shell in contact with said radially inwardly extending flange whereby the sealing ring and shell are assembled in a pre-determined relationship and another radially extending surface on said shell formed in contact with said radially inwardly extending flange whereby said shell is fixed within said sealing ring.

4. A fluid seal assembly for a rotary shaft having a radially extending flange thereon, comprising, in combination: a sealing ring telescopically disposed on said shaft, said sealing ring having a radially inwardly extending flange intermediate the ends thereof; biasing means for urging axially said sealing ring to sealably engage said flange of said shaft; a diaphragm telescopically disposed on said shaft; an a confining shell telescoped within said sealing ring and holding a portion of said diaphragm radially outwardly against said sealing ring adjacent said flange thereof, said confining shell having a portion thereof in contact with one side of said radially extending flange of said sealing ring and having a portion thereof in contact with the inner end of said radially extending flange of said sealing ring whereby the sealing ring and shell are assembled in predetermined relationship.

5. A fluid seal assembly for a rotary shaft having a radially extending flange thereon, comprising, in combination: a sealing ring telescopically disposed on said shaft, said sealing ring having a radially inwardly extending flange intermediate the ends thereof; means defining a radially outwardly extending groove in said sealing ring adjacent said radially inwardly extending flange thereof; biasing means for urging axially said sealing ring to sealably engage said flange of said shaft; a diaphragm telescopically disposed on said shaft, said diaphragm having an enlarged inner end disposed in said groove in said sealing ring; and a confining shell telescoped within said sealing ring and holding said enlarged end of said diaphragm within said groove of said sealing ring, said confining shell having a portion thereof in contact with one side of said radially extending flange of said sealing ring and having a portion thereof in contact with the inner end of said radially extending flange of said sealing ring whereby said sealing ring and said shell are assembled in a predetermined relationship.

References Cited in the file of this patent
UNITED STATES PATENTS

| | | |
|---|---|---|
| 2,192,395 | La Bour | Mar. 5, 1940 |
| 2,434,589 | Roth | Jan. 13, 1948 |
| 2,645,508 | Payne | July 14, 1953 |